United States Patent
Kim

(10) Patent No.: US 11,014,611 B2
(45) Date of Patent: May 25, 2021

(54) FRONT BODY OF VEHICLE

(71) Applicants: Hyundai Motor Company, Seoul (KR); Kia Motors Corporation, Seoul (KR)

(72) Inventor: Byung Gyu Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 126 days.

(21) Appl. No.: 16/545,563

(22) Filed: Aug. 20, 2019

(65) Prior Publication Data
US 2020/0324822 A1    Oct. 15, 2020

(30) Foreign Application Priority Data
Apr. 11, 2019    (KR) .......................... 10-2019-0042694

(51) Int. Cl.
| | | |
|---|---|---|
| *B60J 7/00* | (2006.01) | |
| *B62D 21/15* | (2006.01) | |
| *B62D 31/00* | (2006.01) | |
| *B62D 25/20* | (2006.01) | |
| *B62D 25/14* | (2006.01) | |

(52) U.S. Cl.
CPC ......... *B62D 21/152* (2013.01); *B62D 25/145* (2013.01); *B62D 25/2018* (2013.01); *B62D 31/003* (2013.01)

(58) Field of Classification Search
CPC .............. B62D 25/082; B62D 21/152; B62D 25/2018; B62D 25/04; B62D 25/088; B60G 2206/60; B60G 2300/07; B60G 3/20; B60K 17/00; B60K 17/06
See application file for complete search history.

(56) References Cited

U.S. PATENT DOCUMENTS

| | | | | |
|---|---|---|---|---|
| 4,875,704 | A  * | 10/1989 | Tomosada .......... | B60G 21/0551 280/124.152 |
| 4,909,565 | A  * | 3/1990 | Harasaki .............. | B62D 21/152 296/187.09 |
| 4,919,474 | A  * | 4/1990 | Adachi ................ | B62D 25/082 296/198 |
| 5,125,715 | A  * | 6/1992 | Kijima ................. | B62D 21/152 293/132 |

(Continued)

FOREIGN PATENT DOCUMENTS

KR    2017-0070294 A    6/2017

*Primary Examiner* — Kiran B Patel
(74) *Attorney, Agent, or Firm* — Mintz Levin Cohn Ferris Glovsky and Popeo, P.C.; Peter F. Corless

(57) ABSTRACT

A front body of a vehicle includes left and right front side members extending forward from a left end part and a right end part of a lower end of a dash panel, an upper back beam connecting front ends of the front side members and extending in a width direction of the vehicle, left and right front center members extending forward from a central left part and a central right part of the lower end of the dash panel, a lower back beam connecting front ends of the front center members and extending in the width direction of the vehicle, and first and second support members, the first support member connecting the left front side member and the left front center member and the second support member connecting the right front side member and the right front center member.

10 Claims, 5 Drawing Sheets

(56) References Cited

U.S. PATENT DOCUMENTS

| | | | | |
|---|---|---|---|---|
| 6,773,057 B2* | 8/2004 | Nomura | B62D 25/082 | 280/788 |
| 7,008,007 B2* | 3/2006 | Makita | B60R 19/24 | 280/784 |
| 7,584,815 B2* | 9/2009 | Ogawa | B60G 3/20 | 180/312 |
| 8,500,178 B2* | 8/2013 | Tsuyuzaki | B60R 19/18 | 293/102 |
| 8,894,129 B2* | 11/2014 | Katou | B62D 21/152 | 296/187.03 |
| 9,233,719 B2* | 1/2016 | Shibata | B62D 29/008 | |
| 9,248,865 B2* | 2/2016 | Hisazumi | B62D 25/082 | |
| 9,725,122 B2* | 8/2017 | Kim | B62D 25/082 | |
| 9,834,086 B2* | 12/2017 | Iwamoto | B60K 11/04 | |
| 10,604,189 B2* | 3/2020 | Sekiya | B62D 27/00 | |
| 2003/0080587 A1* | 5/2003 | Kitagawa | B62D 21/155 | 296/187.09 |
| 2004/0200659 A1* | 10/2004 | Miyasaka | B62D 21/155 | 180/312 |
| 2005/0046165 A1* | 3/2005 | Gomi | B62D 21/152 | 280/781 |
| 2008/0066886 A1* | 3/2008 | Mabuchi | F01N 5/02 | 165/67 |
| 2008/0150326 A1* | 6/2008 | Maruyama | B62D 21/152 | 296/192 |
| 2008/0238148 A1* | 10/2008 | Nakamura | B62D 25/2018 | 296/203.01 |
| 2009/0140546 A1* | 6/2009 | Okabe | B60R 19/18 | 296/187.09 |
| 2009/0146455 A1* | 6/2009 | Honji | B62D 25/088 | 296/187.09 |
| 2012/0248820 A1* | 10/2012 | Yasui | B60R 19/34 | 296/187.09 |
| 2013/0056293 A1* | 3/2013 | Schurna | B62D 23/005 | 180/68.5 |
| 2013/0249246 A1* | 9/2013 | Kitaizumi | B60R 19/18 | 296/187.09 |
| 2015/0298742 A1* | 10/2015 | Ono | B62D 25/082 | 296/187.09 |
| 2016/0107695 A1* | 4/2016 | Lee | B62D 21/152 | 296/187.09 |
| 2016/0311461 A1* | 10/2016 | Hardesty | B62D 3/12 | |
| 2016/0368535 A1* | 12/2016 | Kim | B62D 29/008 | |
| 2017/0021866 A1* | 1/2017 | Kim | B62D 25/082 | |
| 2017/0151919 A1* | 6/2017 | Kashiwagi | B60R 19/34 | |
| 2017/0166258 A1* | 6/2017 | Kim | B62D 25/082 | |
| 2018/0178845 A1* | 6/2018 | Hayashi | B62D 25/084 | |
| 2018/0244320 A1* | 8/2018 | Fukuoka | B62D 21/11 | |
| 2018/0257710 A1* | 9/2018 | Komiya | B62D 21/06 | |
| 2018/0370568 A1* | 12/2018 | Ayukawa | B62D 25/08 | |
| 2020/0062314 A1* | 2/2020 | Matsuoka | B62D 29/007 | |
| 2020/0148268 A1* | 5/2020 | Yashiro | B62D 25/08 | |
| 2020/0324820 A1* | 10/2020 | Kim | B62D 25/08 | |
| 2020/0324821 A1* | 10/2020 | Heo | B62D 25/16 | |
| 2020/0324826 A1* | 10/2020 | Heo | B62D 21/11 | |

* cited by examiner

FRONT BODY OF VEHICLE

CROSS-REFERENCE TO RELATED APPLICATION

This application claims under 35 U.S.C. § 119(a) the benefit of Korean Patent Application No. 10-2019-0042694, filed on Apr. 11, 2019 in the Korean Intellectual Property Office, the entire contents of which are incorporated herein by reference.

BACKGROUND

1. Technical Field

The present disclosure relates to a front body of a vehicle which may effectively increase front collision performance and rigidity even if the vehicle has a short front overhang, such as in a micro-mobility vehicle.

2. Description of the Related Art

Recently, as electric vehicles appear and fuel efficiency and environmental issues are on the rise, market demand for micro vehicles, i.e., micro-mobility vehicles for transporting one or two people, is increasing.

A micro-mobility vehicle is developed as an electric vehicle or is provided with a micro-engine located at a rear portion thereof, and is thus generally designed to have a very short length of a front body thereof.

Therefore, the micro-mobility vehicle has a design in which a front overhang corresponding to a distance from front wheels to the front end of the vehicle is extremely short.

However, if the front overhang is short, it is very difficult to secure a space which may absorb impact upon front collision. Particularly, in such a vehicle, since an engine is located at the rear portion of the vehicle, it is unnecessary to install a sub-frame on a front body of the vehicle, and consequently, it is more difficult to secure collision rigidity.

Therefore, a design of a micro-mobility vehicle in which the front body has an effective impact absorbing structure is required.

The above description has been provided to aid in understanding of the background of the present disclosure and should not be interpreted as conventional technology known to those skilled in the art.

SUMMARY

Therefore, the present disclosure provides a front body of a vehicle which may effectively increase front collision performance and rigidity even if the vehicle has a short front overhang, such as in a micro-mobility vehicle.

In accordance with the present disclosure, the above and other objects can be accomplished by the provision of a front body of a vehicle including left and right front side members configured to extend forward from a left end part and a right end part, respectively, of a lower end of a dash panel of the vehicle; an upper back beam configured to connect front ends of the front side members and to extend in a width direction of the vehicle; left and right front center members configured to extend forward from a central left part and a central right part, respectively, of the lower end of the dash panel; a lower back beam configured to connect front ends of the front center members and to extend in the width direction of the vehicle; and first and second support members, the first support member being configured to connect the left front side member and the left front center member and the second support member being configured to connect the right front side member and the right front center member.

Wheel housing parts may be formed at the left end part and the right end part of the lower end of the dash panel, and the front side members may extend forward from the wheel housing parts.

The front center members may be located at positions of the dash panel lower than the front side members.

The front center members may be located at positions of the dash panel between the front side members.

A front cross member may be provided at the lower end of the dash panel, and the front center members may extend forward from the front cross member.

The front side members may be coupled to the dash panel at positions spaced upwardly from the front cross member.

A center cross member may be provided on a floor of the vehicle, extension members may extend forward from a central left part and a central right part of the center cross member along the floor, and the extension members may be connected to the front center members with the dash panel interposed therebetween.

The lower end of the dash panel may be connected to the floor, the front cross member protruding toward the ground and extending in the width direction of the vehicle may be provided between the dash panel and the floor, the extension members may extend along an upper surface of the floor and be connected to the front center members, upper points of rear ends of the front center members may be connected to the extension members with the dash panel interposed therebetween, and lower points of the rear ends of the front center members may be connected to the front cross member.

The front body may further include a connection member configured to connect both the front center members in the width direction of the vehicle.

One end of each of the support members may be connected to a point of the corresponding front center member facing the connection member and extend in the width direction of the vehicle, and the other end of each of the support members may be connected to the corresponding front side member.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE PREFERRED EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Reference will now be made in detail to the preferred embodiments of the present disclosure, examples of which are illustrated in the accompanying drawings. Wherever possible, the same reference numbers will be used throughout the drawings to refer to the same or like parts.

Figure 1:
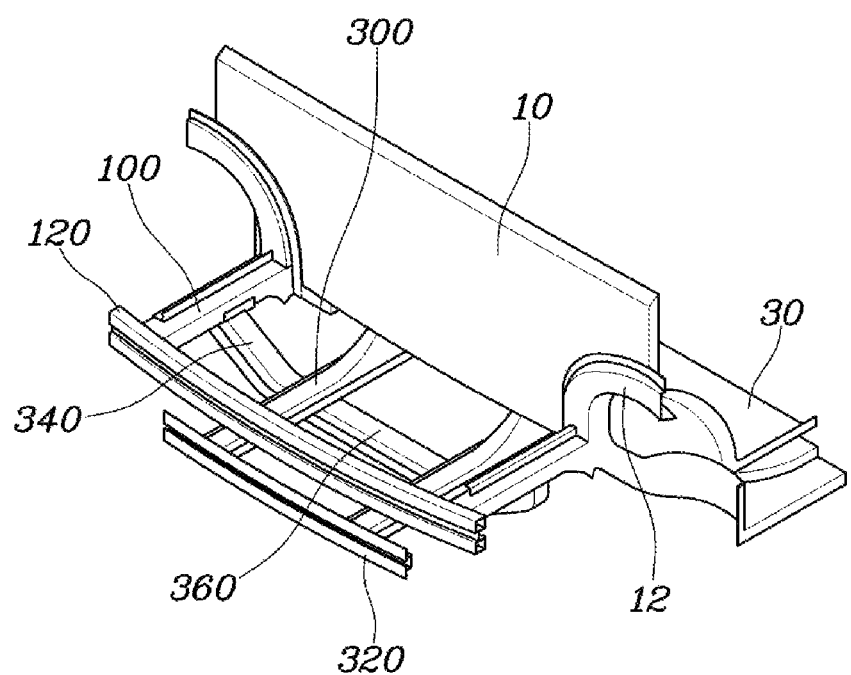
FIG. 1 is a perspective view of a front body of a vehicle in accordance with one embodiment of the present disclosure.
Figure 2:
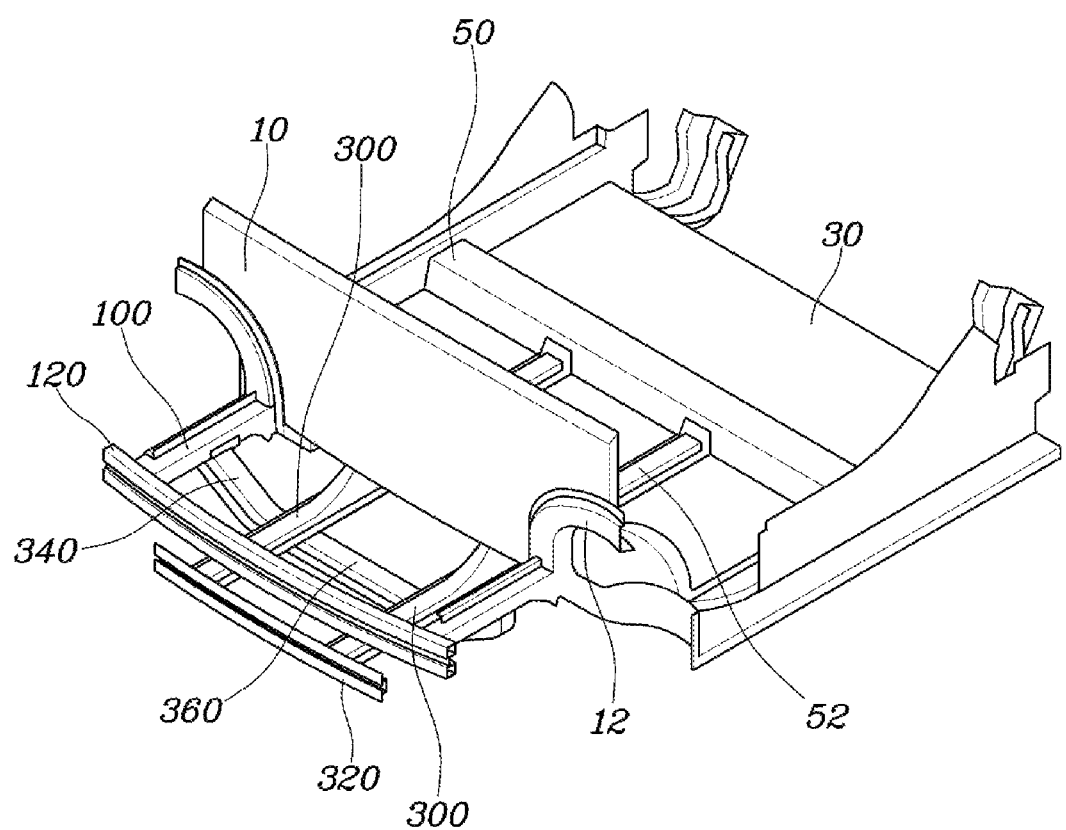
FIG. 2 is a perspective view illustrating a state in which the front body in accordance with one embodiment of the present disclosure is coupled to a floor.
Figure 3:
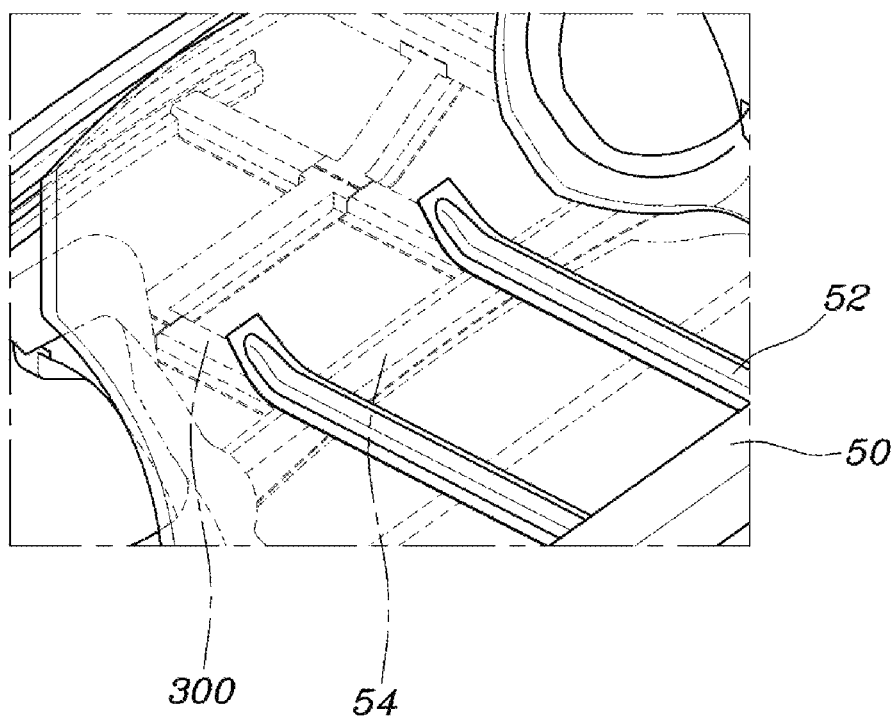
FIG. 3 is a perspective view of the front body in accordance with one embodiment of the present disclosure, as seen from the rear.
Figure 4:
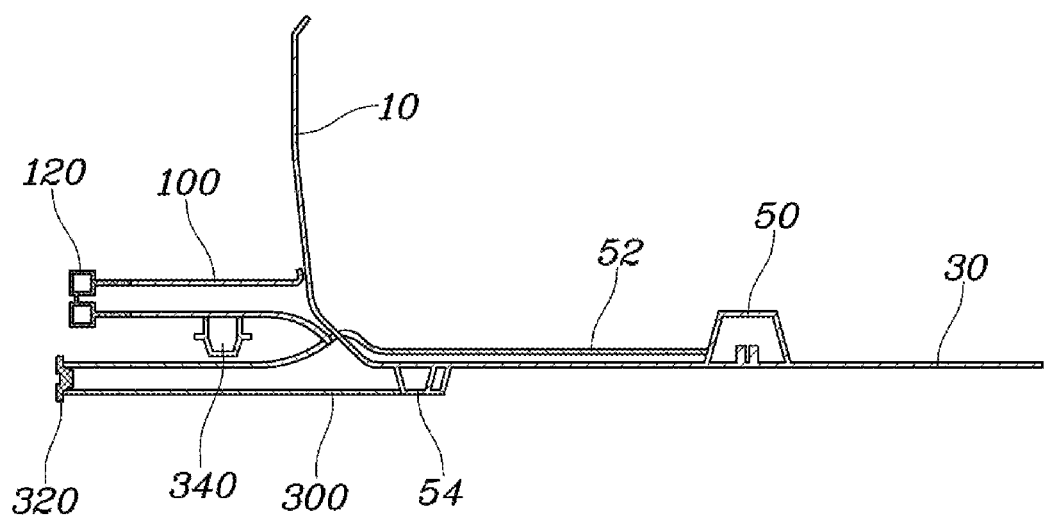
FIG. 4 is a cross-sectional view of the front body in accordance with one embodiment of the present disclosure.
Figure 5:
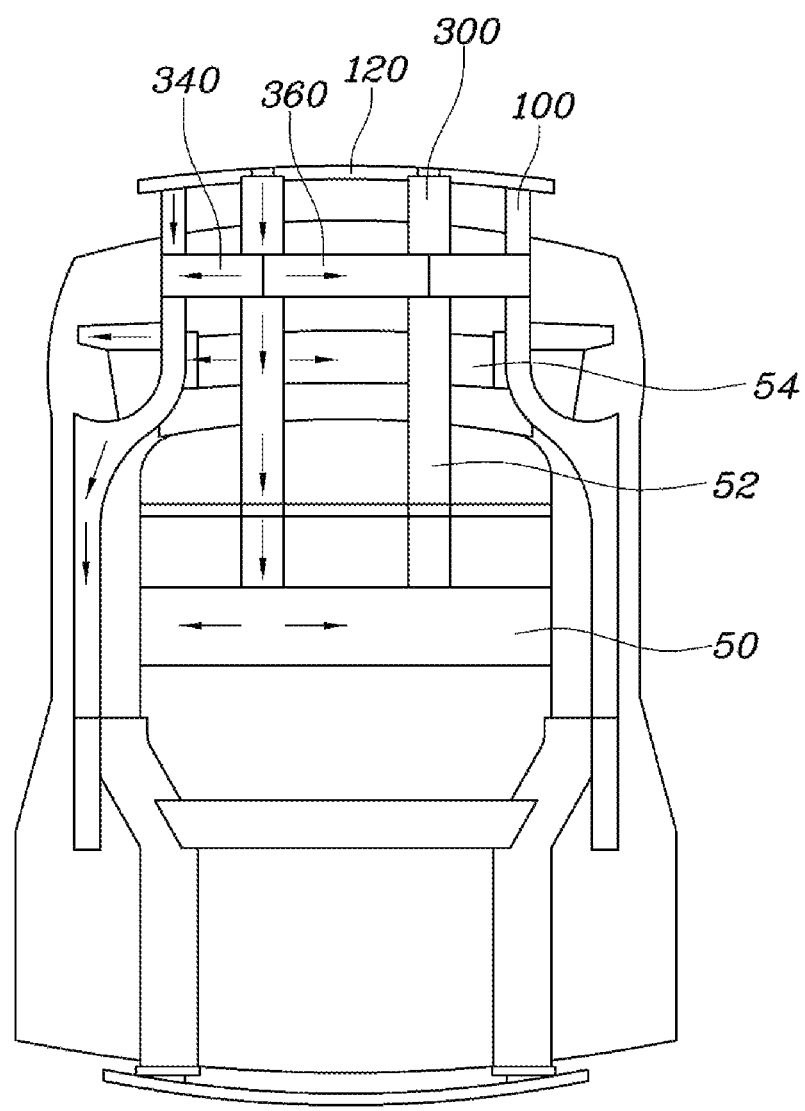
FIG. 5 is a top view illustrating load paths of the front vehicle body in accordance with one embodiment of the present disclosure.

FIG. 1 is a perspective view of a front body of a vehicle in accordance with one embodiment of the present disclosure, FIG. 2 is a perspective view illustrating a state in which the front body in accordance with one embodiment of the present disclosure is coupled to a floor, FIG. 3 is a perspective view of the front body in accordance with one embodiment of the present disclosure, as seen from the rear, FIG. 4 is a cross-sectional view of the front body in accordance with one embodiment of the present disclosure, and FIG. 5 is a top view illustrating load paths of the front vehicle body in accordance with one embodiment of the present disclosure.

A front body of a vehicle in accordance with the present disclosure includes left and right front side members 100 extending forward from a left end part and a right end part, respectively, of the lower end of a dash panel 10 of the vehicle; an upper back beam 120 connecting the front ends of the front side members 100 and extending in a width direction of the vehicle; left and right front center members 300 extending forward from a central left part and a central right part, respectively, of the lower end of the dash panel 10; a lower back beam 320 connecting the front ends of the front center members 300 and extending in the width direction of the vehicle; and first and second support members 340, the first support member 340 connecting the left front side member 100 and the left front center member 300 and the second support member 340 connecting the right front side member 100 and the right front center member 300.

The present disclosure relates to a front body structure of a vehicle having a new concept designed to sufficiently secure front collision performance, even if the vehicle is a vehicle having an extremely short front overhang, by locating a driver unit, such as an engine, a motor or the like, at a rear portion of the vehicle.

As the front overhang is short and the engine is not located at a front portion of the vehicle, it is unnecessary to install a sub-frame in a lower region of the front portion of the vehicle. However, if no sub-frame is installed, it is difficult to exhibit sufficient supporting force when a front collision occurs, and thus, reinforcement of other members is required.

In the present disclosure, first, the left and right front side members 100 extending forward from the left end part and the right end part, respectively, of the lower end of the dash panel 10 are provided. Further, the upper back beam 120 connecting the front ends of the front side members 100 and extending in the width direction of the vehicle is provided. That is, the front side members 100 provided at both sides of the front portion of the vehicle are prepared for collision, and the front side members 100 and the upper back beam 120 form load paths.

Also, the left and right front center members 300 extending forward from the central left part and the central right part, respectively, of the lower end of the dash panel 10 are provided. Further, the lower back beam 320 connecting the front ends of the front center members 300 and extending in the width direction of the vehicle is provided. The front center members 300 are located at positions closer to the center of the dash panel 10 than the front side members 100, and are provided as a pair of left and right front center members 300 so as to serve to reinforce collision rigidity which is not sufficient only using the front side members 100.

Instead of omission of the conventional sub-frame, the front center members 300 and the lower back beam 320 are added, and thus collision rigidity may be secured. In addition, such a structure may be disposed because certain components, such as an engine, are not located at the front body of the vehicle, and thus a front space of the vehicle is sufficiently usable even if the front overhang is short. In conventional vehicles, an engine is disposed in an engine compartment and causes a difficulty in space utilization, and thus, the above overlapping members, such as the front center members 300 and the lower back beam 320, may not be applied.

In order to prevent the front side members 100 or the front center members 300 from buckling in a front collision, e.g., so as to protect vehicle occupants and to connect the front side members 100 and the front center members 300 to each other to acquire effective load paths due to impact dispersion, the first and second support members 340 are provided. In particular, the first support member 340 connects the left front side member 100 and the left front center member 300, and the second support member 340 connects the right front side member and the right front center member 300. Further, one end of each support member 340 may be connected to a point of the front center member 300 facing a connection member 360 and extend in the width direction of the vehicle, and the other end of each support member 340 may be connected to the front side member 100.

As exemplarily shown in FIGS. 1-2, since the support members 340 extend from the front center members 300 located at position relatively close to the center of the dash panel 10 to the outside of the vehicle and ends of the support members 340 are connected to the front side members 100, the support members 340 may form load paths between the front side members 100 and the front center members 300, form a structure in which the front side members 100 and the front center members 300 may mutually support each other, and thus prevent the front side members 100 and the front center members 300 from buckling in collision so as to protect the passenger seat and to uniformly disperse impact, thereby improving collision performance.

Wheel housing parts 12 may be formed at the left end part and the right end part of the lower end of the dash panel 10, and the front side members 100 may extend forward from the wheel housing parts 12. As a result, the front center members 300 may be located at positions of the dash panel lower than the front side members 100. Further, the front center members 300 may be located at positions of the dash panel 10 between both front side members 100. That is, by providing the front center members 300 at the lower end of the central part of the dash panel 10 and providing the front side members 100 at the wheel housing parts 12, the front side members 100 are located at positions which are higher than the front center members 300 and are closer to the outside of the vehicle than the front center members 300, and thereby the front side members 100 and the front center members 300 form a reversed trapezoidal shape and may thus effectively cope with not only front collision but also oblique collision and offset collision.

A front cross member 54 may be provided at the lower end of the dash panel 10, and the front center members 300 may extend forward from the front cross member 54. In particular, the lower end of the dash panel 10 is connected to a floor 30, and the front cross member 54 protruding toward the ground and extending in the width direction of the vehicle is provided between the dash panel 10 and the floor 30. Such a front cross member 54 is provided between the dash panel 10 and the floor 30 and reinforces torsional rigidity of a bent connection part of the dash panel 10. The front center members 300 extend forward from the front cross member 54, and thus, in the event of a collision, supporting force of the front center members 300 may be secured using the front cross member 54.

In addition, a center cross member 50 may be provided on the floor 30 of the vehicle, extension members 52 may extend forward from a central left part and a central right part of the center cross member 50 along the floor 30, and the extension members 52 may be connected to the front center members 300 with the dash panel 10 interposed therebetween. That is, in order to further reinforce supporting force of the front center members 300 in the event of a collision, the extension members 52 supported by the center cross member 50 support the front center members 300, and thus, in a front collision, the front center members 300 may not be pushed rearward, and load paths which propagate impact upon collision to a rear portion of the vehicle along side portions of the vehicle may be formed.

Further, the extension members 52 may extend along the upper surface of the floor 30 and be connected to the front center members 300, upper points of rear ends of the front center members 300 may be connected to the extension members 52 with the dash panel 10 interposed therebetween, and lower points of the rear ends of the front center members 300 may be connected to the front cross member 54. Such a structure is shown in FIG. 4. By connecting the rear ends of the front center members 300 to both the extension members 52 and the front cross member 54, the load paths may be designed as paths using both the front cross member 54 and the center cross member 50, and the front center members 300 are supported by both the front cross member 54 and the center cross member 50 and thus sufficient supporting force of the front center members 300 may be secured. In order to implement such a connection structure, the center cross member 50 is disposed on the upper surface of the floor 30, and the front cross member 54 is disposed on the lower surface of the floor 30.

Both front center members 300 are connected by the connection member 360 configured to connect the front center members 300 in the width direction of the vehicle, and thus, the load paths in all directions may be used even in oblique collision or offset collision, as exemplarily shown in FIG. 5, and buckling of the front center members 300 and the front side members 100 may be prevented in front collision.

The front body of the vehicle in accordance with the present disclosure may effectively increase front collision performance and rigidity and form omnidirectional load paths, even if the vehicle is a vehicle, such as a micro-mobility vehicle, in which a front overhang is extremely short, no engine is installed in a front portion of the vehicle and thus a sub-frame is omitted.

As is apparent from the above description, a front body of a vehicle in accordance with the present disclosure may effectively increase front collision performance and rigidity even if the vehicle is a vehicle having an extremely short front overhang, such as a micro-mobility vehicle.

Although the preferred embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A front body of a vehicle, comprising:
   left and right front side members configured to extend forward from a left end part and a right end part, respectively, of a lower end of a dash panel of the vehicle;
   an upper back beam configured to connect front ends of the front side members and to extend in a width direction of the vehicle;
   left and right front center members configured to extend forward from a central left part and a central right part, respectively, of the lower end of the dash panel;
   a lower back beam configured to connect front ends of the front center members and to extend in the width direction of the vehicle; and
   first and second support members, the first support member being configured to connect the left front side member and the left front center member and the second support member being configured to connect the right front side member and the right front center member.

2. The front body according to claim 1, wherein wheel housing parts are formed at the left end part and the right end part of the lower end of the dash panel, and the front side members extend forward from the wheel housing parts.

3. The front body according to claim 1, wherein the front center members are located at positions of the dash panel lower than the front side members.

4. The front body according to claim 1, wherein the front center members are located at positions of the dash panel between the front side members.

5. The front body according to claim 1, wherein a front cross member is provided at the lower end of the dash panel, and the front center members extend forward from the front cross member.

6. The front body according to claim 5, wherein the front side members are coupled to the dash panel at positions spaced upwardly from the front cross member.

7. The front body according to claim 1, wherein a center cross member is provided on a floor of the vehicle, extension members extend forward from a central left part and a central right part of the center cross member along the floor, and the extension members are connected to the front center members with the dash panel interposed therebetween.

8. The front body according to claim 7, wherein the lower end of the dash panel is connected to the floor, a front cross member protruding toward the ground and extending in the width direction of the vehicle is provided between the dash panel and the floor, the extension members extend along an upper surface of the floor and are connected to the front center members, upper points of rear ends of the front center members are connected to the extension members with the dash panel interposed therebetween, and lower points of the rear ends of the front center members are connected to the front cross member.

9. The front body according to claim 1, further comprising a connection member configured to connect both the front center members in the width direction of the vehicle.

10. The front body according to claim 9, wherein one end of each of the support members is connected to a point of the corresponding front center member facing the connection member and extends in the width direction of the vehicle, and the other end of each of the support members is connected to the corresponding front side member.

* * * * *